UNITED STATES PATENT OFFICE 2,122,899

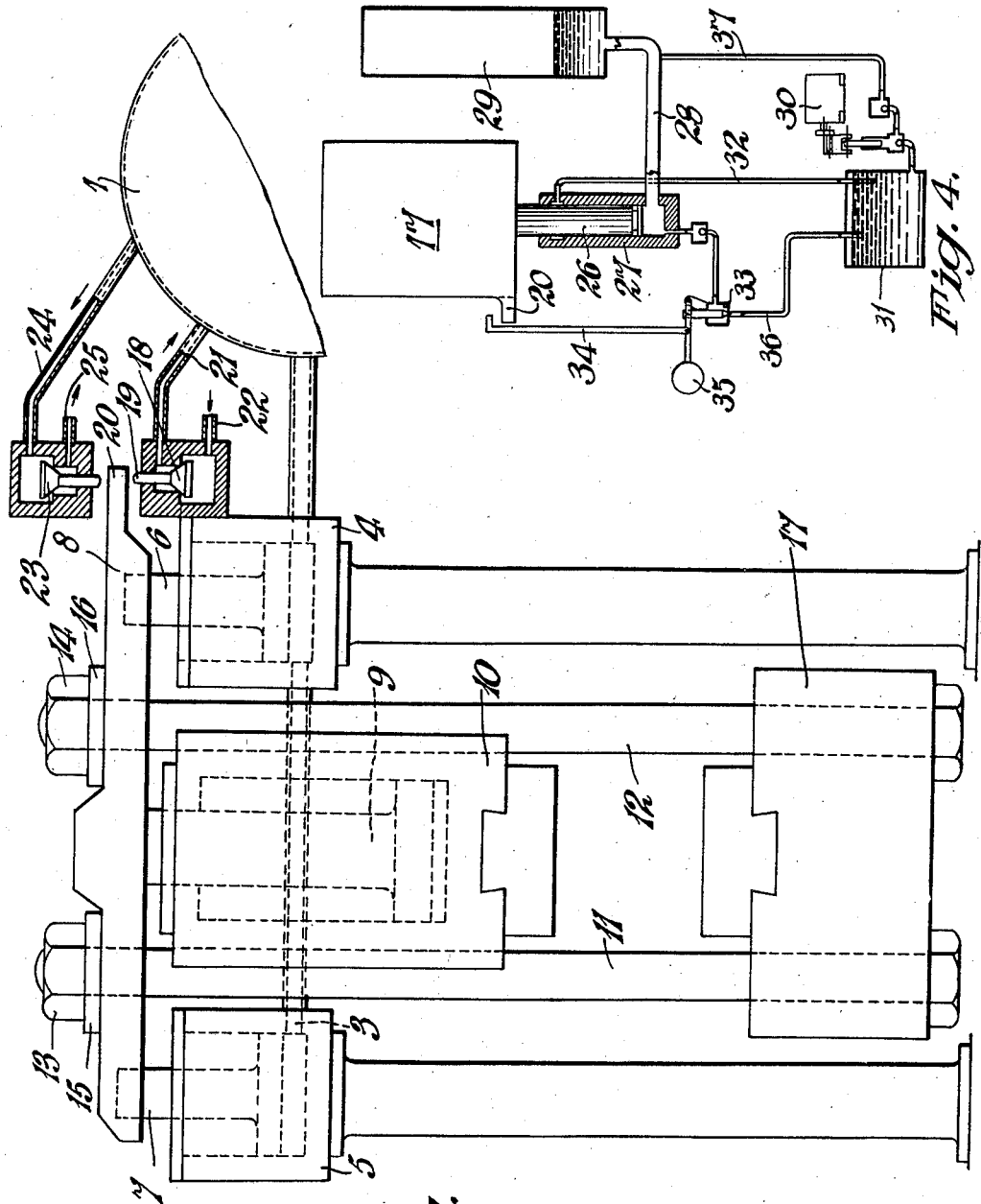

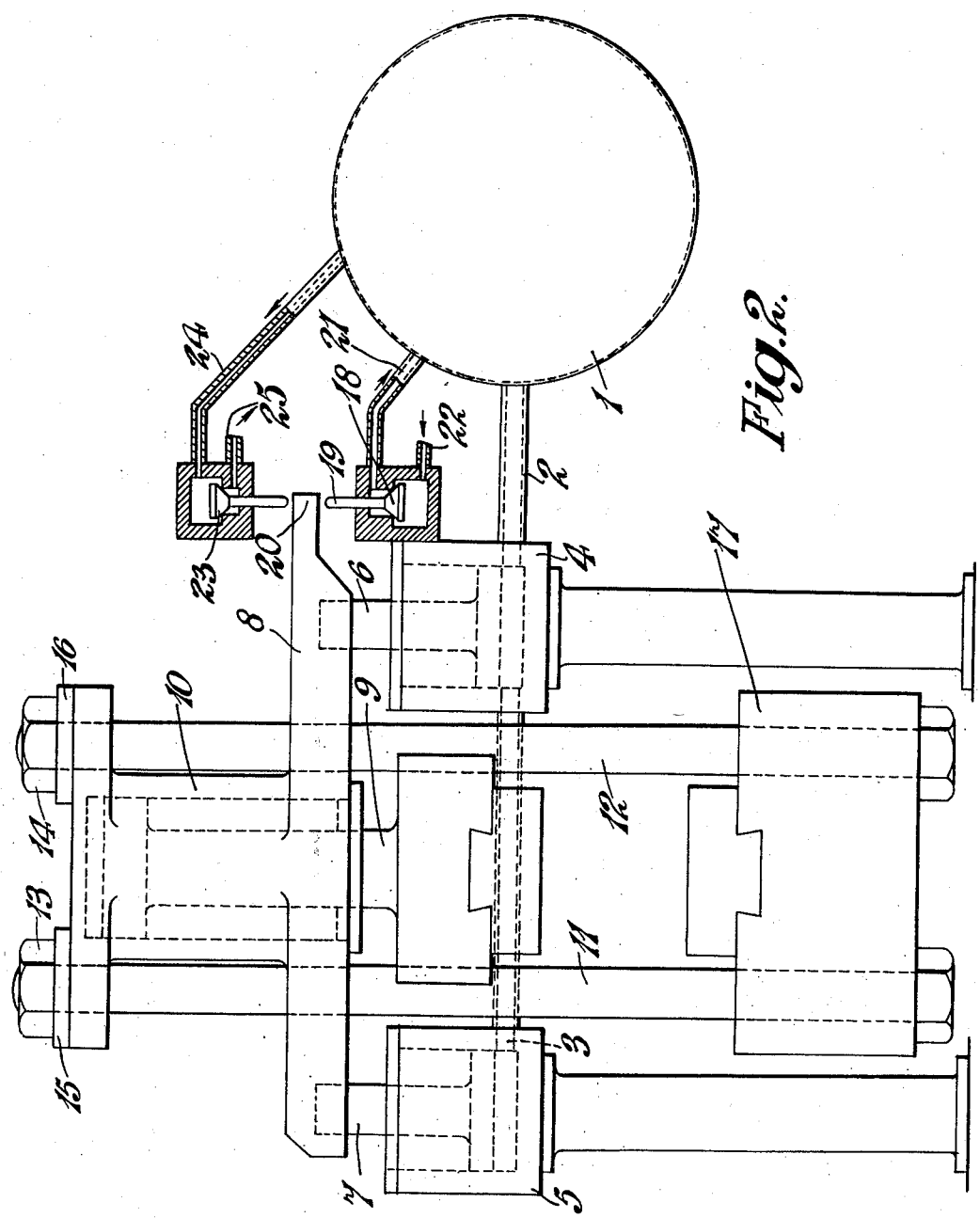

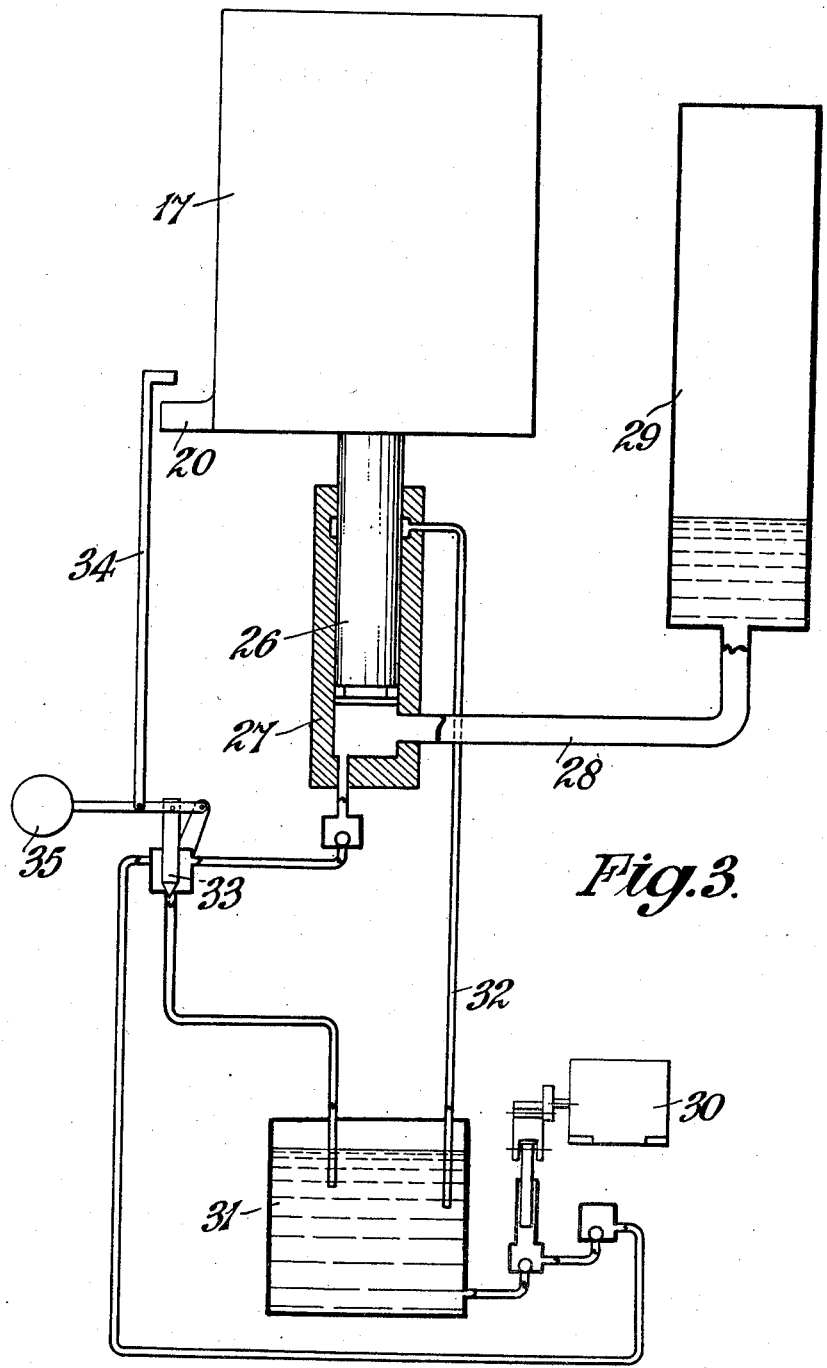

FLUID-OPERATED BALANCING SYSTEM

Frank Hathorn Towler and John Maurice Towler, Rodley, near Leeds, England

Application August 12, 1936, Serial No. 95,664
In Great Britain August 19, 1935

10 Claims. (Cl. 78—20)

This invention relates to fluid-operated balancing systems consisting of a single acting balancing piston and cylinder or like device in communication with a receiver containing an elastic fluid under pressure for the purpose of balancing out the weight of a moving part of any suitable type of mechanism such for example as drop stamps, or power, steam or compressed air hammers.

In systems of the above type as hitherto proposed, the pressure in the receiver has been maintained as nearly as possible to a predetermined value by means of a pressure sensitive device controlling the supply of fluid under pressure to the receiver from some external source. However, owing to the displacements of the piston itself, the pressure in the receiver fluctuates between known limits, although at the same time the pressure sensitive device is tending to restore the pressure to the predetermined level so that at any instant the actual pressure in the receiver depends upon the time which has elapsed since a motion of the piston has taken place, or in general upon some function of the motion of the piston and the rate at which the pressure sensitive device can restore the predetermined pressure. In consequence, in such known systems, unless the motion of the piston and the characteristics of the pressure sensitive device are known, the actual pressure in the receiver at any instant cannot be determined, and, even in such cases where the pressure can be determined, the variation in pressure is not necessarily what is desired.

The object of the present invention is to make the action of such systems more reliable by controlling the thrust on the balancing piston or the like so that for any given position of the piston the thrust is substantially constant.

In a fluid operated balancing system according to the present invention the mass is supported to oscillate about a predetermined mean position by a body of elastic pressure fluid for example compressed air within a receiver of predetermined capacity, said fluid acting upon the piston or its equivalent within the balancing cylinder and being at such a pressure as to exert a thrust on the piston which will cause the mass to be supported at the predetermined position corresponding to the centre of oscillation, said mean position being maintained by valve means operating automatically to control the admission and/or release of pressure fluid to correct a displacement from the predetermined centre of oscillation of the mass resulting from leakage of pressure fluid past the piston, changes in the weight of the mass or other causes.

The pressure in the receiver is sufficient to support the combined weights of the frame, anvil and tup when the tup is at the top of its stroke. On the downward stroke of the tup the weight of the same is removed from the supported mass and as a consequence of the unbalanced pressure thus set up the anvil automatically rises to meet the descending tup at a predetermined point. The momentum of the tup and the momentum of the anvil are thus cancelled out so that practically the whole of the kinetic energy of the moving parts of the hammer or the like is converted into useful work without shock on the foundation.

The term "receiver" is used in this specification to describe an enclosed capacity containing the elastic pressure fluid and the same may be represented by the balance cylinder alone or by the balance cylinder plus a connected container.

Whilst the invention is not limited in its application to drop stamps and power operated hammers its use in connection with such machines is particularly advantageous as it permits the full force of the blow to be absorbed by the work without shock on the foundation. For this purpose the combined weights of the tup, anvil and dies and their associated parts may represent the mass to be supported by the elastic pressure fluid. The automatically operating control means for maintaining constant the pressure in the receiver may consist of a single valve serving periodically to admit pressure fluid to the receiver when the centre of oscillation has fallen below a predetermined point or a single valve for releasing pressure from the receiver when the centre of oscillation has risen above a predetermined point or a combination of the two valves.

In order that the invention may be clearly understood and carried into effect power hammers representing examples of each of the above three embodiments will now be described by aid of the accompanying somewhat diagrammatic drawings in which:—

Fig. 1 is a view illustrating the embodiment having two automatically operated valves, one for admitting air to the receiver and the other for releasing air from the receiver.

Fig. 2 is an elevation illustrating the embodiment having a single automatically operated admission valve.

Fig. 3 is a similar view illustrating the embodiment having a single automatically operated release valve and showing a method of reducing leakage of pressure fluid by interposing a body of liquid between the air in the receiver and the balancing piston.

Fig. 4 illustrates an embodiment similar to that illustrated in Fig. 3 but in which the pressure within the receiver is reduced when the mass is oscillating above the predetermined centre of oscillation through the instrumentality of an automatically operated release valve.

In the embodiment illustrated in Fig. 1 which shows a hammer having a cylinder tup, the receiver 1 is connected by pipes 2 and 3 to the balance cylinders 4 and 5, having piston rods 6 and 7, which support the cross head 8, on which is mounted the usual valve gear, not shown. Attached to the cross head 8 is a hammer piston 9, which works within a cylinder tup 10. Steam or air passages, not shown, are provided in the piston and connected to the valve gear, which latter controls the supply and exhaust of compressed air or steam to both sides of the said piston in order to reciprocate the cylinder tup as desired. Slidably mounted and depending from the crosshead 8 are columns 11 and 12, which are supported by nuts 13 and 14 and resilient washers 15 and 16. These columns form guides for the tup 10, and at their lower ends are rigidly secured to the anvil block 17. Attached to a suitable stationary part of the hammer, such for instance as the balance cylinder 4, is a valve 18 having a spindle 19, which when depressed admits pressure fluid from an outside source of supply through the pipes 21 and 22 to the receiver 1. Should the lower extremity of the oscillation of the hammer fall below a predetermined point, the spindle 19 is depressed by an abutment 20 on the cross head 8 thereby lifting the valve 18 from its seating and permitting pressure fluid to flow into the receiver through the pipes 21 and 22. When the hammer is working under normal conditions the abutment 20 oscillates clear of the valve spindle. It will be understood that, in the arrangement above described, the valve 18 serves automatically to make up leakage and to prevent the hammer frame and anvil block oscillating below a certain point such as would cause it to come into collision with the foundations or stationary parts of the machine. Thus, if there is any leakage and/or heavier dies are used, the valve 18 automatically admits more pressure fluid into the receiver 1 so as to prevent the hammer from oscillating below the normal point.

Further in this embodiment the leakage past the pistons of the balancing cylinders may be more or less negligible and accordingly should lighter dies be used or the moving mass be lightened in any manner the oscillation of the mass would rise above the predetermined point. To prevent this a further valve 23 exactly similar in construction to the valve 18, but inverted, is arranged. This valve is connected to the receiver 1 by a pipe 24. Should the oscillation rise above the predetermined point the abutment 20 engages the spindle of the valve 23 and permits pressure fluid to escape from the receiver 1, through the pipe 24 to an exhaust pipe 25.

In a modification of the hammer shown in Fig. 1 a piston tup is used and such modification is illustrated in Fig. 2. In this modification the cylinder 10 is mounted on the cross head 8 and the valve gear is mounted upon the cylinder. The piston tup 9 works in the said cylinder, the tup being guided on the columns 11. In other respects the construction is substantially the same as Fig. 1 and the centre of oscillation is controlled by valve 18 and/or valve 23 in exactly the same way as described for Fig. 1.

Alternatively valve 18 could be dispensed with provided that the receiver 1 was arranged to have a small supply of pressure fluid constantly flowing into it, and the valve 23 would serve by itself to control the oscillation of the mass (just as valve 18 did by itself in the first instance). That is to say, if the constant flow of pressure fluid into the receiver exceeded leakage and/or lighter dies were employed, the centre of oscillation of the mass would tend to rise so that ultimately the abutment on the crosshead 8 lifts the spindle of the valve 23 and allows the excess pressure fluid in the receiver to escape. This arrangement is illustrated diagrammatically in Fig. 3.

The hammer frame and anvil 17 are supported on a single balance piston 26 operating in a balance cylinder 27 filled with oil under pressure in direct communication by means of a pipe 28 with a receiver 29 of sufficiently small size in relationship to the working displacement of the balancing cylinder to provide a change of thrust of the said cylinder sufficient to locate the centre of oscillation of the mass or masses about a given level or datum line and yet not so small as to cause the creation of secondary oscillations and containing in its upper closed end a body of air under suitable pressure, such air being confined on its underside by a body of oil which completely fills the available space in the balance cylinder and the pipe leading to the receiver, and partially fills the lower end of the receiver. Oil is pumped into the cylinder 27 by a continuously running pump 30, which draws the oil from a reservoir 31, to which leakage past the piston also returns through pipe 32. The escape valve 33 serves the same purpose as valves 18 and 23 of Figs. 1 and 2. That is to say that the pump runs continuously and maintains the oil under pressure such that the piston 26 supports the hammer and makes up any leakage. If the delivery of the pump is in excess of leakage, the piston 26 will tend to rise; so that, as the frame and anvil block 17 oscillate in sympathy with the oscillation of the tup, the abutment 20 will engage a tappet rod 34 and thereby lift the spindle of valve 33 and by-pass the delivery of the pump back into the reservoir 31, consequently preventing the hammer and anvil block from oscillating above the upper limit. In this arrangement it is provided that the delivery of the pump is equal to or in excess of any leakage, so that the frame and anvil block are automatically maintained near the upper limit of oscillation and do not tend to fall much below it. If heavier dies are used, the pump will automatically deliver oil into the cylinder 27 and receiver 29 until the pressure is sufficiently raised to compensate for the increased weight of dies, and then the hammer and anvil block will again oscillate near the upper limit and the escape valve 33 will be operated if the oscillations tend to rise above the upper limit. If on the other hand lighter dies are used, the hammer and anvil block will tend immediately to oscillate above the upper limit and lift the escape valve spindle, thereby cutting out further delivery from the pump until the pressure of oil and air in 27 and 29 has fallen in compensation for the reduction in the weight of dies.

It will be understood that, if the hammer and anvil block is oscillating near the upper limit, the abutment 20 may be almost constantly in engagement with the tappet rod 34, which would cause the valve 33 to have a hunting action, which is not desirable. To prevent a hunting action, catches or the like devices, not shown, may be provided to hold the spindle up when the hammer and anvil block oscillate above the upper limit, the spindle being released and the valve 33 made to close by the balance weight 35 when the hammer frame and anvil block begin to oscillate below the lower limit and the abutment 20 engages a further tappet, also not shown, in order to effect this release, thus bringing the pump into action again so as to bring the centre of oscillation up to the normal.

Thus it will be seen that by the use of one or orther or both of the valves, as described above, the centre of oscillation of the mass can be prevented from rising or falling above or below predetermined upper and lower limits. That is to say that, when the hammer is working, the whole hammer tends to oscillate in sympathy with the oscillation of the tup, and the centre of oscillation is allowed to float between upper and lower limits under the automatic control of valve and/or valves irrespective of leakage and/or change in the weight of the dies, or friction or other cause.

It is of course to be understood that the capacity of the receiver must be suitably predetermined. If this capacity is too small the oscillations of the supported mass will become violent. On the other hand if the capacity is too large the change in pressure as the centre of oscillation rises or falls will be so small as to be insufficient for the mass to centre itself.

As an example the following particulars are given of a power hammer which was constructed in accordance with the present invention:—

Weight of anvil block:
 Die and frame_____tons__ 15.3
Weight of tup and die_____do____ 0.7
Stroke of tup relative to
 Anvil block_____inches__ 31
Stroke of anvil block relative to
 Earth _____do____ 1.43

Balance piston 14″ diameter connected to anvil block by leverage system to 4:1 ratio and supplied with air pressure at approximately 60 lbs./sq. in.

It was found that the best results were obtained with a receiver capacity of between 20,000 cu. in. and 25,000 cu. in.

A capacity of 16,000 cu. in. gave the anvil block a marked natural period, so that it got out of step with the blows of the tup.

A capacity of 35,000 cu. in. did not give sufficient variation of air pressure at different positions of the anvil block to ensure the blows taking place at an approximately constant level.

In lieu of using an abutment to operate the valves the same may be operated by the movement of the centre of oscillation up or down instead of by the oscillating movement of the mass at upper or lower limits. This may be effected by the use of a bell crank lever, one arm of which is pivoted to a plunger engageable by an inclined ramp on the tup, the bell crank lever being so proportioned that the end of the valve lever which operates the valve or valves remains stationary in spite of the reciprocation of the tup and anvil, excepting when the centre of oscillation tends to rise or fall, in which latter case the said end of the valve lever rises or falls in unison and thereby operates the valve to make the necessary correction.

What we claim is:—

1. In a percussive tool, the combination of a frame member, an anvil block carried thereby, a tup mounted on said frame for reciprocating movement above said block, and to be supported by said frame when at the top of its upward movement, elastic fluid pressure means for supporting the weight of said frame, tup and block before said tup descends, for causing said frame and block to rise when the weight of the tup is released therefrom in descending, and means for automatically adjusting the pressure of said fluid pressure means on variation from normal in the movement of said block.

2. In a percussive tool, the combination of an anvil block and a reciprocating tup above the same, elastic fluid pressure means arranged to support the weight of both tup and block before the tup descends and for causing the block to rise when the weight of the tup is removed therefrom in descending, and means for automatically varying the pressure of said fluid pressure means in consequence of any variation from normal in the movement of said block.

3. In a percussive tool, the combination of a frame member, an anvil block carried thereby, a tup mounted on said frame for reciprocating movement above said block and to be supported by said frame at the top of its upward movement, and elastic fluid pressure means arranged to support the weight of said frame, tup and block at about a predetermined height before said tup descends and for accordingly causing said frame and block to rise by the release therefrom of the weight of the tup when descending, said elastic fluid pressure means including a receiver for confining the elastic fluid as an enclosed body at the pressure required to support said weights at the predetermined height and means operable automatically on any variation from the determined height to control the pressure within said receiver to counteract any such variation.

4. In a percussive tool, the combination of a block adapted to receive blows thereon and required to oscillate about a predetermined mean position, means for supporting the same comprising a cylinder, a piston therein and means for maintaining elastic fluid pressure in said cylinder, and means operable by movement of said block past either determined limit of oscillation for varying the pressure in said cylinder to counteract the tendency of said block to move past said limits.

5. In a percussive tool, the combination of a member to be supported, a cylinder, a piston extending downwardly from said member into said cylinder, a receiver for confining elastic pressure fluid, connected at the bottom to said cylinder below said piston, means for continuously maintaining a body of liquid in the lower part of said receiver, to compress the elastic fluid therein, and in said cylinder below said piston, to support said member at a predetermined height, and means operable automatically on any variation in said height to vary the pressure in the receiver to counteract any such variation in height of the supported member.

6. In a percussive tool, the combination of a member to be supported, a cylinder, a piston extending downwardly from said member into said cylinder, a receiver for confining elastic pressure fluid, a connection from the bottom of said receiver to said cylinder below said piston, a source of liquid supply, means for continuously forcing liquid from said source to said cylinder below said piston, said connection, and the lower part of said receiver, to compress the elastic fluid in said receiver and support said member, a return connection from said cylinder above said piston to said source, for leakage past said piston, a valve in the connections between said forcing means and said cylinder and receiver, and means for automatically opening said valve upon the rise of said member to a determined point.

7. In a percussive tool, the combination of a frame member, an anvil block carried thereby, a tup mounted on said frame for reciprocation above said block, and to be supported by said frame when at the top of its upward movement, a co-operating piston and cylinder, one of the same being fixed and the other connected to said block, means for supplying fluid under pressure between said cylinder and piston to support the weight of said frame, tup, and block before said tup descends and for causing said block and frame to rise when the weight of the tup is released therefrom in descending, a valve member controlling the supply of fluid pressure to said cylinder, an abutment movable with said block, and an operative connection from said valve member positioned to be contacted by said abutment upon movement of said block past a predetermined level.

8. In a percussive tool, the combination of a member to be supported, a co-operating piston and cylinder, one of the same being fixed and the other connected to said member, a receiver for confining elastic pressure fluid, a connection from the bottom of said receiver to said cylinder, means for continuously forcing liquid to the lower part of said receiver, said connection and said cylinder, to compress the elastic fluid in said receiver and to support said member, an abutment movable with said member, means contacted thereby when said member rises to a predetermined point, an escape valve connected to said cylinder, and means operated by movement of said contacted means to open said escape valve, to decrease the pressure in said cylinder.

9. In a percussive tool, the combination of an anvil block required to rise and fall above and below a predetermined mean position, means for supporting the same comprising a cylinder and piston therein, one of the same being fixed and the other connected to said block, a receiver communicating with said cylinder, means for supplying fluid under elastic pressure to said receiver to support said block, at said mean position, and means operable by descent of said block to a predetermined point below said mean position to increase the pressure in said cylinder.

10. In a percussive tool, the combination of an anvil block required to rise and fall above and below a predetermined mean position, means for supporting the same, comprising a cylinder and piston therein, one of the same being fixed and the other connected to said block, a receiver for confining elastic pressure fluid, a connection from the bottom of said receiver to said cylinder, a source of liquid supply, connections for carrying liquid therefrom to said receiver and cylinder, a liquid exit connection for said receiver and cylinder, a normally closed valve in said exit connection, means for pumping liquid from said source to said receiver and cylinder to compress the elastic fluid in said receiver and to support said block, and means for automatically opening said valve upon the rise of said block to a determined point.

FRANK HATHORN TOWLER.
JOHN MAURICE TOWLER.